(12) United States Patent
Alferink

(10) Patent No.: US 10,094,520 B2
(45) Date of Patent: Oct. 9, 2018

(54) LED LUMINARIE FOR USE IN DAIRY BARNS

(71) Applicant: Robertus Gerardus Alferink, Son en Breugel (NL)

(72) Inventor: Robertus Gerardus Alferink, Son en Breugel (NL)

(73) Assignee: DELAVAL HOLDING AB, Tumba (SE)

( * ) Notice: Subject to any disclaimer, the term of this patent is extended or adjusted under 35 U.S.C. 154(b) by 130 days.

(21) Appl. No.: 14/399,984

(22) PCT Filed: May 22, 2013

(86) PCT No.: PCT/EP2013/060462
§ 371 (c)(1),
(2) Date: Nov. 10, 2014

(87) PCT Pub. No.: WO2013/174841
PCT Pub. Date: Nov. 28, 2013

(65) Prior Publication Data
US 2015/0146420 A1   May 28, 2015

(30) Foreign Application Priority Data
May 22, 2012 (NL) ..................... 2008849

(51) Int. Cl.
*F21S 4/00* (2016.01)
*F21K 99/00* (2016.01)
(Continued)

(52) U.S. Cl.
CPC .................. *F21K 9/30* (2013.01); *A01K 1/00* (2013.01); *A01K 29/00* (2013.01); *F21K 9/20* (2016.08);
(Continued)

(58) Field of Classification Search
CPC ..................................... F21Y 2105/10–2105/18
(Continued)

(56) References Cited

U.S. PATENT DOCUMENTS

| 7,198,387 B1 * | 4/2007 | Gloisten | B60Q 3/025 |
| | | | 362/218 |
| 2003/0076669 A1 * | 4/2003 | Itoh | G02B 6/0016 |
| | | | 362/621 |

(Continued)

FOREIGN PATENT DOCUMENTS

| CN | 101761868 A | 6/2010 |
| CN | 101852388 A | 10/2010 |

(Continued)

OTHER PUBLICATIONS

Dutch Search Report, dated Nov. 23, 2012, from corresponding Dutch application.

(Continued)

*Primary Examiner* — Sean Gramling
(74) *Attorney, Agent, or Firm* — Young & Thompson

(57) ABSTRACT

A LED luminaire for use in a livestock barn includes a base plate provided with at least one first LED arrangement configured to, in operation, emit light which simulates daylight lighting conditions. The first LED arrangement includes a plurality of LEDs of a first type, which has at least one peak wavelength in the wavelength range between 500 and 600 nm, and at least one LED of a second type, which is a blue LED with its peak wavelength in the wavelength range between 440 and 480 nm. The luminaire is provided with an optical system configured so that the intensity of light emitted by the LEDs is distributed according a distribution which has its peak intensity at an angle of more than zero degrees from the optical axis of the luminaire.

17 Claims, 5 Drawing Sheets

(51) Int. Cl.

| | | |
|---|---|---|
| *A01K 29/00* | (2006.01) | |
| *F21V 29/76* | (2015.01) | |
| *A01K 1/00* | (2006.01) | |
| *F21V 23/00* | (2015.01) | |
| *F21V 23/04* | (2006.01) | |
| *F21K 9/20* | (2016.01) | |
| *F21K 9/60* | (2016.01) | |
| *F21K 9/69* | (2016.01) | |
| *F21W 131/00* | (2006.01) | |
| *F21Y 105/12* | (2016.01) | |
| *F21Y 105/10* | (2016.01) | |
| *F21Y 115/10* | (2016.01) | |
| *F21Y 113/13* | (2016.01) | |

(52) U.S. Cl.
CPC ............... *F21K 9/60* (2016.08); *F21K 9/69* (2016.08); *F21V 23/003* (2013.01); *F21V 23/04* (2013.01); *F21V 29/763* (2015.01); *F21W 2131/00* (2013.01); *F21Y 2105/10* (2016.08); *F21Y 2105/12* (2016.08); *F21Y 2113/13* (2016.08); *F21Y 2115/10* (2016.08)

(58) Field of Classification Search
USPC .......................................................... 362/231
See application file for complete search history.

(56) References Cited

U.S. PATENT DOCUMENTS

| | | |
|---|---|---|
| 2007/0215890 A1 | 9/2007 | Harbers et al. |
| 2007/0253196 A1 | 11/2007 | Ormiston |
| 2008/0297020 A1 | 12/2008 | Wanninger et al. |
| 2009/0324732 A1 | 12/2009 | Gnann |
| 2010/0177262 A1 | 7/2010 | Kimura et al. |
| 2011/0228515 A1 | 9/2011 | Grajcar |
| 2012/0002408 A1* | 1/2012 | Lichten .............. F21S 8/063 362/218 |
| 2012/0020071 A1 | 1/2012 | McKenzie |

FOREIGN PATENT DOCUMENTS

| | | |
|---|---|---|
| DE | 10 2008 013 589 A1 | 6/2009 |
| EA | 200900275 A1 | 12/2010 |
| EP | 2 149 296 A2 | 2/2010 |
| EP | 2 384 621 A1 | 11/2011 |
| JP | 2009-510731 A | 3/2009 |
| JP | 2009-519021 A | 5/2009 |
| JP | 2012-064860 A | 3/2012 |
| NL | 1016244 C2 | 3/2002 |
| RU | 2214073 C2 | 10/2003 |
| RU | 2248025 C2 | 3/2005 |
| RU | 2008141124 A | 4/2010 |
| RU | 101526 U1 | 1/2011 |
| RU | 110453 U1 | 11/2011 |
| WO | 2009/109387 A1 | 9/2009 |

OTHER PUBLICATIONS

International Search Report, dated Aug. 7, 2013, from corresponding PCT application.
Japanese Office Action issued in Application No. 2015-513146, dated Jan. 20, 2017.
Jun. 16, 2017, RU communication issued for related RU application No. 2014151768/07(082886).

* cited by examiner

LED LUMINARIE FOR USE IN DAIRY BARNS

BACKGROUND OF THE INVENTION AND PRIOR ART

The present invention relates to a LED luminaire for use in a livestock barn. The light is in such a luminaire emitted by Light Emitting Diodes (LEDs).

It is well known that lighting affects milk production. According to several studies the photoperiod can exert a positive effect on dairy performance when managed properly—see e.g. the article "Management of photoperiod in the dairy herd for improved production and health" by Dahl et al., published in J ANIM SCI 2003, 81:11-17. Long day lighting (LDL) has consistently been shown to improve milk yield during lactation. However, continuous lighting is not associated with greater milk yield, and, in fact, production between cows on natural or short day photoperiod and those under 24 hours of light does not differ.

Cows are sensitive animals and their day-and-night rhythm is of paramount importance. Particular light levels are necessary to impact the difference between day and night on the cow's body. As soon as a certain light level reaches the retina, the cow's nerves will send a signal to the hypophysis in the brain to lower the secretion of the hormone melatonin. This hormone results in sleepiness, increases the percentage of body fats, and disturbs the animal's productive capabilities. When the melatonin level decreases, another hormone, IGF-I, increases in the animal's blood. The function of the IGF-I hormone is to stimulate animal's activity and, hence, its milk production. Therefore, more light means an increase of milk production. Establishing a 24 hour cycle of 16 hours of daylight of 180 lux brightness (measured one meter above ground floor level) and 8 hours of darkness has been empirically shown to give the best results.

It has been suggested in e.g. the article "Photopigment basis for dichromatic color vision in cows, goats, and sheep" by Jacobs et al., published in Visual Neuroscience 15, 581-584 (1998), that cow eyes have a different wavelength sensitivity curve than human eyes.

Problems Associated with the Prior Art

If a light level of 150-200 lux is to be maintained in all areas of a barn for 16 hours a day, this costs a lot of energy. With prior art barn lighting systems it is difficult to evenly distribute the light in all directions. This means that if a minimum light level is to be reached in all areas of the barn which the cows can visit, the light level in some areas will have to be considerably higher than the minimum light level, which means that energy is wasted.

The need to reduce energy consumption has been recognized in the prior art, but usually solved by simply turning off the light when and where it is not needed. For example, EP2149296 describes controlling the lighting in various sections of a shed in dependence on the current location of the animals.

Barn lighting systems are usually based not on LED technology but on high intensity discharge (HID) lamps. Such lamps have a fixed spectrum which is dependent on the chemical components in the lamp. It would thus not be possible to adapt the spectrum emitted by a HID lamp to the eye sensitivity curve of cows, in order to emit only light that actually increases milk production.

SUMMARY OF THE INVENTION

The object of the present invention is to offer a luminaire which can be used in a more energy-efficient way.

According to the invention, the object is achieved by the initially described LED luminaire, which comprises a base plate provided with a first LED arrangement configured to, in operation, emit light which simulates daylight lighting conditions, which first LED arrangement comprises a plurality of LEDs of a first type, which has at least one peak wavelength in the wavelength range between 500 and 600 nm, and at least one LED of a second type, which is a blue LED with its peak wavelength in the wavelength range between 440 and 480 nm, preferably between 455 and 475 nm, wherein the luminaire is provided with an optical system configured in such a way that the intensity of light emitted by the LEDs is distributed according an intensity distribution which has its peak intensity at an angle of more than zero degrees from the optical axis of the luminaire.

It has been shown empirically that subjecting cows to blue light increases milk production. At the same time, emitting just blue light in the barn would make it very difficult for the farmer to differentiate between different objects. The eye sensitivity curve of cows shows that cow eyes, in addition to being sensitive to light in the wavelength range between 440 and 480 nm (blue light), are also sensitive to light in the wavelength range between 500 and 620 nm. For this reason, the LED of the first type is preferably a white LED, which emits light that is useful for both the cow and the farmer (white LEDs usually have a broad peak wavelength somewhere between 500 and 600 nm, but may have other peak wavelengths as well). In this way, the light emitted by the LED luminaire can be adapted to match the eye sensitivity curve of cows, which means that virtually no light is emitted that can not be "seen" by the cows.

In order to ensure that the minimum light level is reached in all areas of the barn without any light being wasted, the peak intensity of the emitted light should be at an angle of more than zero degrees from the optical axis of the luminaire. In this way, all of the emitted light is actually used to increase milk production, and no energy is wasted.

In an embodiment of the invention, the LED of the first type is a phosphor-coated blue LED, which before phosphor-coating had its peak wavelength in the wavelength range between 440 and 460 nm. The phosphor-coated blue LED could in such a case be configured to predominantly emit light in the range between 500 nm and 620 nm and have a peak wavelength in this range, but have a further peak wavelength close to the peak wavelength of the original blue LED, i.e. in the wavelength range between 440 and 460 nm. Phosphor conversion gives a broad spectrum which matches well with the eye sensitivity of the cows.

In an embodiment of the invention, the first LED arrangement only comprises LEDs of the first type and LEDs of the second type. Preferably, the ratio of the number of LEDs of the first type to the number of LEDs of the second type is at least 10 to 1, more preferably at least 15 to 1, even more preferably at least 20 to 1. In a particular example, for every 60 LEDs, 57 LEDs of the first type and 3 LEDs of the second type are provided. That is, one LED in twenty may be of the second type, the other nineteen being of the first type. This ensures that the light emitted by the LED luminaire is adapted to the eye sensitivity curve of the cows.

In an embodiment of the invention, the intensity distribution has its peak intensity at an angle of at least 40 degrees from the optical axis of the luminaire, preferably at least 50 degrees from the optical axis, more preferably at least 60 degrees from the optical axis. Preferably, the intensity distribution has its peak intensity at an angle of at most 75 degrees from the optical axis, preferably at most 65 degrees from the optical axis, and is generally bat-wing shaped. Such an intensity distribution does not have its peak intensity at the optical axis of the luminaire (in this case, an axis perpendicular to the plane of the base plate, and in the vertical direction when the luminaire, in use, is horizontally attached to a roof or ceiling), but instead has its peak intensity at an angle with the optical axis. At angles greater than the peak intensity angle, the intensity may quickly drop to (near) zero. Such an intensity distribution ensures a uniform lighting level.

In an embodiment of the invention, each LED of the first and the second type in the first arrangement comprises a lens, preferably a side-emitting lens, even more preferably a bubble lens with a bell-shaped interior surface, which creates the desired intensity distribution. The lenses may be optimized for minimizing the emission of horizontal stray light (which typically causes complaints of "light pollution") and improving the lighting uniformity. Another advantage of the more uniform output is that the number of luminaires can be reduced without there being significant dark sections between two luminaires. Empirical results show that for a typical 250 W HID luminaire a distance of 7 meters between luminaires is needed in order to obtain a reasonably even distribution of the required intensity. With a 100 W LED luminaire, the same result could be achieved with 9 meters between luminaires. If an even distribution of light emitted from the luminaires is ensured, they can further be placed at a lower position with respect to the ground than luminaires having a less even distribution pattern, such as standard HID lamps. Since it is the amount of light which actually reaches the cow (usually measured as the light intensity one meter above ground floor level) that is important, a low placed lamp is more energy efficient than a high placed lamp.

In an embodiment of the invention, the luminaire further comprises at least one second LED arrangement configured to, in operation, emit predominantly blue light, said second LED arrangement comprising substantially only LEDs of the second type, and a switch for switching between the different LED arrangements. The addition of an arrangement with blue LEDs to the luminaire makes it possible to save energy by emitting predominantly blue light when there are no people in the barn. The switch can then be used to switch between "normal" and "energy-saving blue" lighting modes.

In an embodiment of the invention, the luminaire further comprises at least one third LED arrangement configured to, in operation, emit light suitable for night lighting, said third LED arrangement comprising substantially only LEDs of a third type, which is a red LED with its peak wavelength in the wavelength range between 610 and 630 nm, and a switch for switching between the different LED arrangements. The addition of an arrangement with red LEDs to the luminaire ensures that the same luminaire can be used for night lighting. The switch can then be used to switch between "day-time" and "night-time" lighting modes.

In an embodiment of the invention, each LED arrangement is provided with a driver for providing power to the LEDs in the LED arrangement. Because the voltage drop over LEDs can change as a function of time, as LED assemblies age, it is advantageous to provide a separate driver for each LED arrangement. Preferably, all LED boards in each LED arrangement are connected in a series using a single driver. This requires a driver that can deliver sufficient power for all LEDs. If such a driver is used, then automatically all LEDs receive the same current due to the series connection.

In an embodiment of the invention, the luminaire further comprises a heat sink thermal-conductively connected to said base plate. This ensures that the luminaire is not overheated.

BRIEF DESCRIPTION OF THE DRAWINGS

In the following, preferred embodiments of the invention are described by examples and with references to the attached drawings, in which.

BRIEF DESCRIPTION OF PREFERRED EMBODIMENTS OF THE INVENTION

Figure 1:
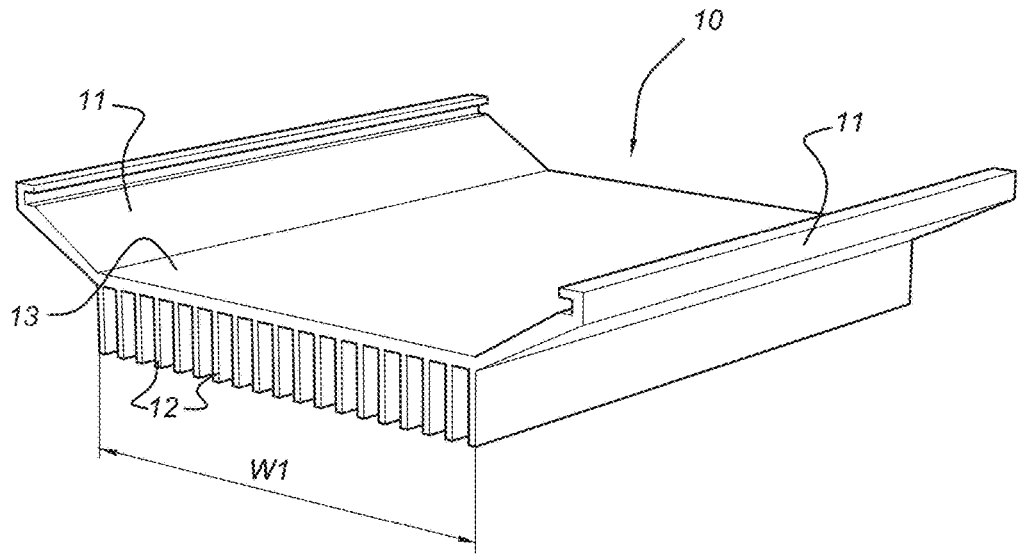
FIG. 1 shows a luminaire body according to an embodiment of the invention, without light sources.
Figure 1A:
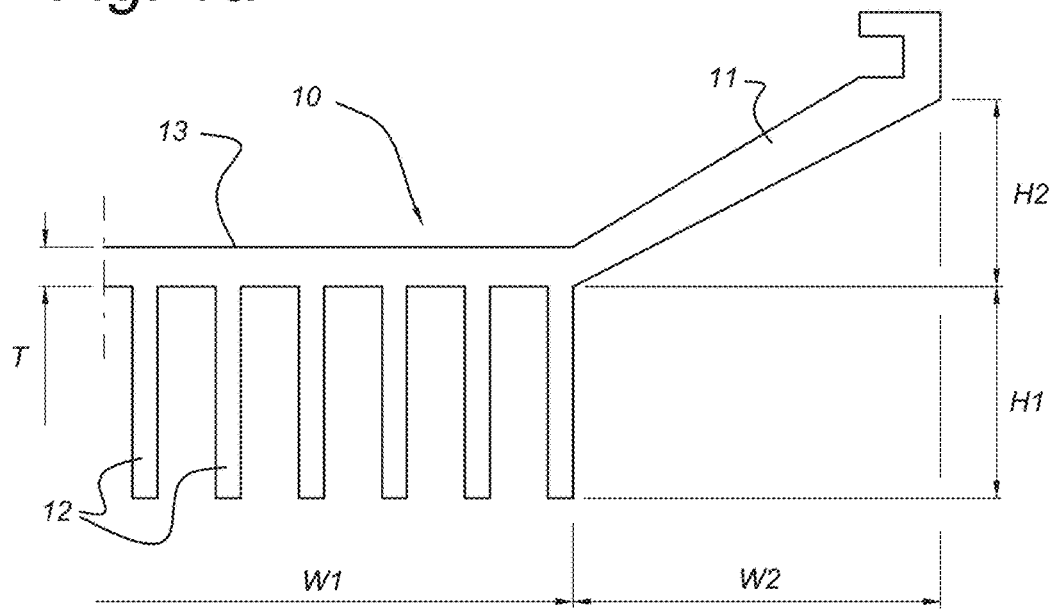
FIG. 1a shows a detail of the luminarie in FIG. 1.

FIGS. 1 and 1a schematically show a luminaire body according to an embodiment of the invention, without light sources. The luminaire body comprises a base plate 13, side walls 11, and, on the side of the base plate 13 opposite the side walls, a heat sink with fins 12. According to an embodiment, the width W1 of the luminaire is about 180 mm, the length of the fins 12 of the heat sink is about 25 mm, each of the heights H1 and H2 is about 25 mm, and the width W2 of the horizontal projection of the side walls 11 is 25-30 mm. The side walls are typically provided with guides for receiving a non-shown glass or plastic plate. The luminaire body can be made of aluminum or any other suitable material. A total length of the luminaire can e.g. be 600-1000 mm, typically approximately 600, 700, or 800 mm.

Figure 2A:
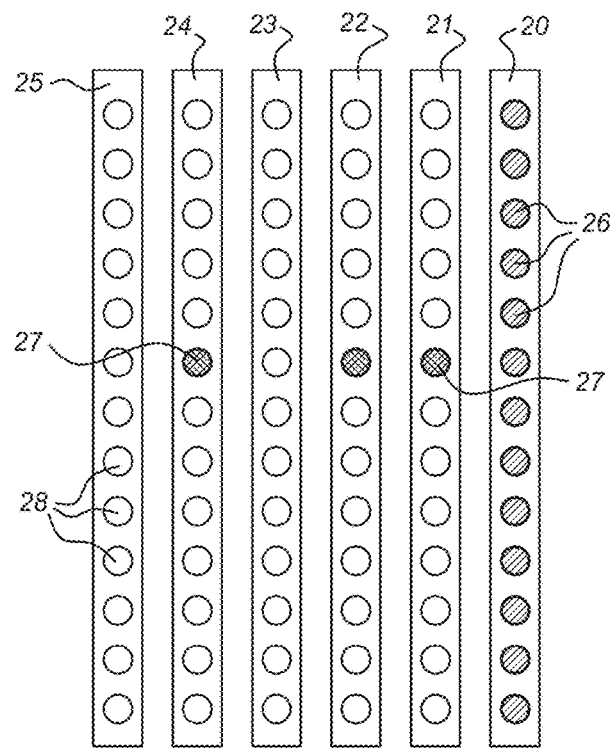
FIG. 2a shows LED boards according to an embodiment of the invention.

FIG. 2a shows LED boards according to an embodiment of the invention. Each LED board comprises at least one electronics board 20, 21, 22, 23, 24, 25 provided with a plurality of LED assemblies 26, 27, 28 and lenses (see also FIG. 3). Each LED assembly comprises a LED chip and the required electronics connections. For brevity, LED assemblies may hereafter be called LEDs.

First LED boards 23 and 25 comprise only LEDs of a first type 28, which has at least one peak wavelength in the wavelength range between 500 and 600 nm (in the particular example shown, 13 LEDs each). Second LED boards 21, 22 and 24 comprise a mixture of LEDs of the first type 28 and LEDs of a second type 27, which is a blue LED with its peak wavelength in the wavelength range between 440 and 480 nm (in this example, each second LED board comprises 12 LEDs of the first type 28 and 1 LED of the second type 27). The wavelength emitted by the blue LEDs of the second type 27 is preferably between 455 and 475 nm. By adding a number of blue LEDs to the predominantly white LEDs of the luminaire, the blue component of the emitted spectrum is enhanced. First and second LED boards 21-25 can thus together emit light that is adapted to match the eye sensitivity curve of cows and to simulate daylight lighting conditions.

Finally, third LED board 20 comprises LEDs of a third type, which is a red LED with its peak wavelength in the wavelength range between 610 and 630 nm, in order to provide lighting at night without unduly disturbing the animals in the barn. The main purpose of the nighttime lighting is to provide a minimal amount of light for e.g. the farmer to find his way around in the barn.

According to an embodiment of the invention, all of the LEDs on a LED board are connected in series. This advantageously ensures that each LED on the LED board receives the same electrical current, making it easier to tune the power source for delivering an optimal amount of electrical power to each LED. Each of the plurality of LED boards in a luminaire may then be connected in series or in parallel to the power source (not shown).

Figure 2B:
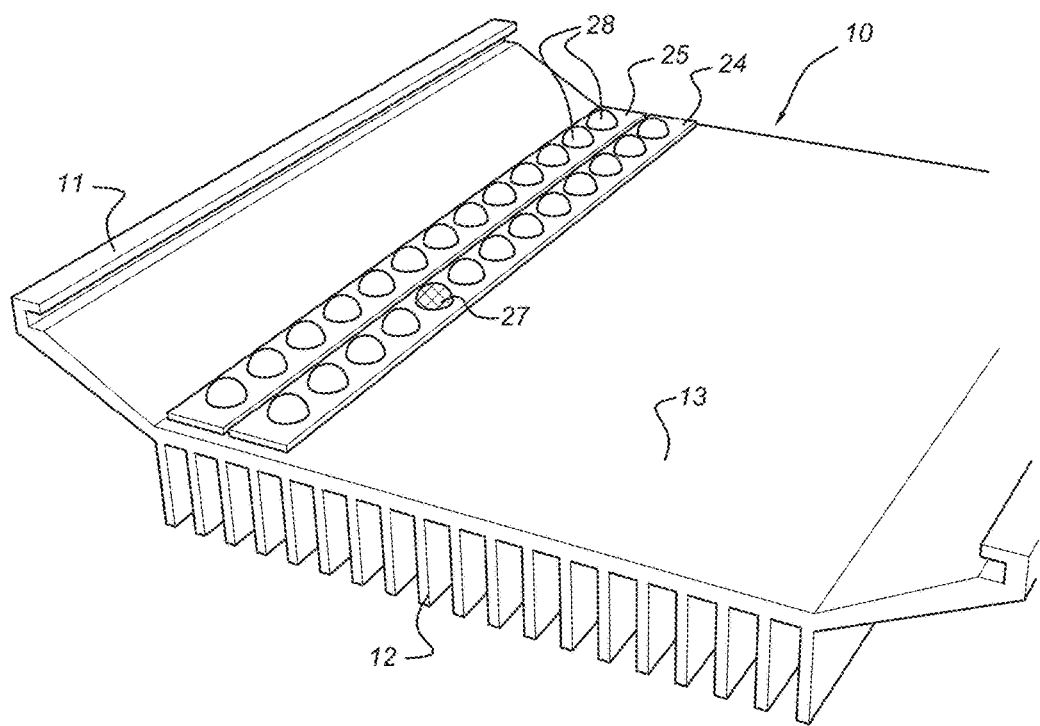
FIG. 2b shows a luminaire according to an embodiment of the invention.

FIG. 2b shows a luminaire 10 according to an embodiment of the invention. Two example LED boards 24 and 25 are shown attached to the base plate 13 of the luminaire 10. In the same manner, more LED boards are typically provided on the luminaire body 10, so that sufficient LEDs are available to reach the required total emitted light intensity. The attachment is made in such a manner that the heat generated by the LEDs can be at least partly dissipated via the heat sink 12.

Figure 3:
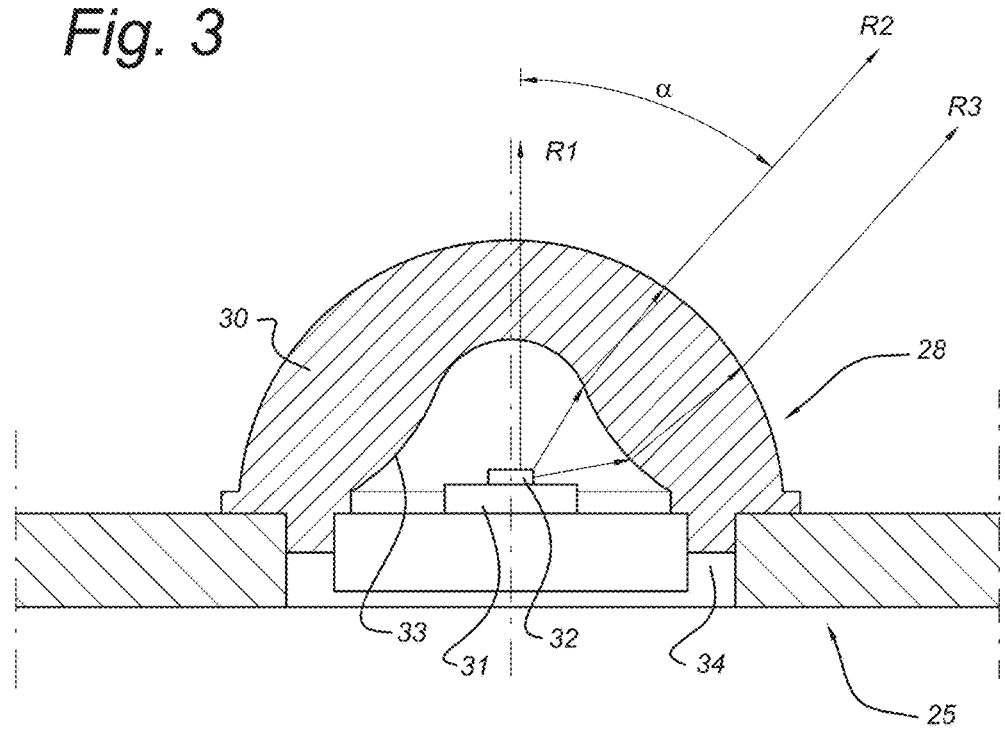
FIG. 3 shows a cross section of a LED assembly and lens according to an embodiment of the invention, FIG. 4 schematically shows a graph of the angular distribution of a lens according to an embodiment of the invention, FIG. 5 schematically shows LED boards and drivers according to an embodiment of the invention, and FIG. 6 schematically shows eye sensitivity curves for cows and matching LED emission spectra.

FIG. 3 shows a cross section of a LED assembly 28 for a LED of the first type 28 and an exemplary lens according to an embodiment of the invention. The LED assembly comprises the LED die 32 and the LED package 31 and is provided on the board 25. The board 25 is provided with a spacing 34, in which an extruding part of the bubble lens 30 can be wedged so that the lens is fixed to the board. Alternatively, the lens can be glued onto the LED assembly or otherwise attached.

The lens 30 can be any type of side-emitting lens. A side-emitting lens is designed for emitting light sideways. When the surface facing the light source is (uniformly) lit (for example using an ideal point source), the lens is designed so that the peak intensity of the light emitted from the outer or exit surface of the lens, when plotted as a function of the angle with the optical axis of the lens, is not on the optical axis (angle 0) but under an angle in all directions (azimuth). In contrast, a standard light source, such as an HID lamp without a lens, will emit light as a function of the angle with the optical axis in a Lambert distribution, which has its peak intensity at the optical axis.

The exemplary bubble lens 30 of FIG. 3 has a spherical outer surface and a bell-shaped inner surface 33. The bell-shape causes the light emitted from the die 32 to be bent in such a way that its angle $\alpha$ to the optical axis R1 is different when it has passed the lens 30. In particular emitted light in an essentially horizontal direction (horizontal means perpendicular to the optical axis R1) parallel to the plane of the board 25 or parallel to the non-shown base plate 13 of the luminaire 10 will be bent towards a direction R3 with a smaller angle $\alpha$ to the optical axis than the original almost 90 degrees. This reduces the stray light from the LED.

Figure 4:
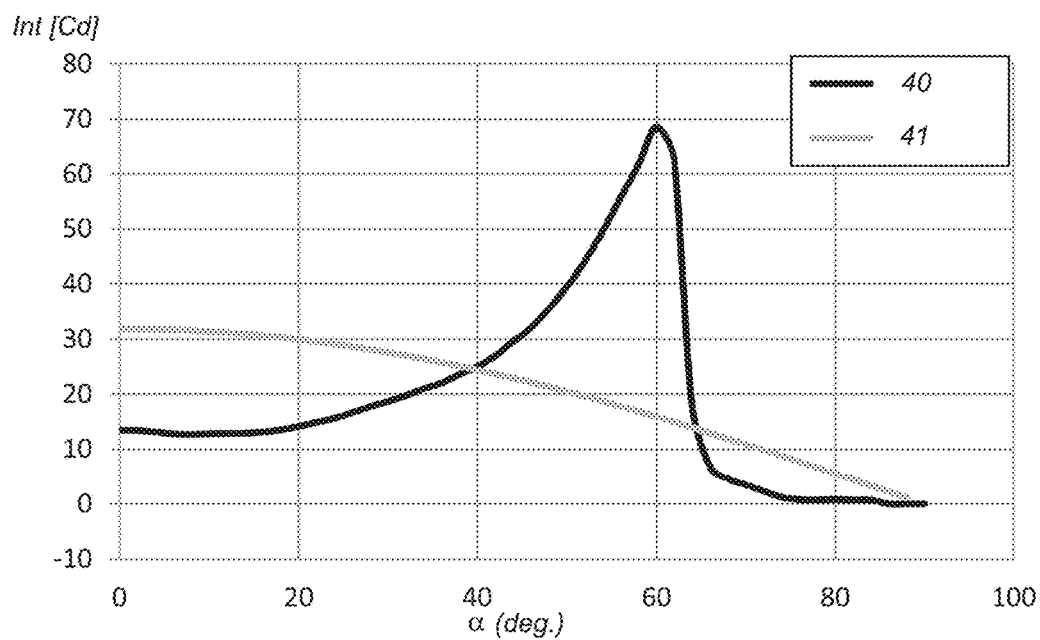

FIG. 4 schematically shows two graphs of the angular intensity distribution of a lens as a function of the angle $\alpha$. An angle $\alpha$ of 0 degrees means parallel to the optical axis of the lens, R1 in FIG. 3. An angle $\alpha$ of 90 degrees would be horizontal using the definition given above, or perpendicular to the optical axis of the lens.

Intensity distribution curve 41 shows the distribution of a standard light source, such as a HID lamp. The standard light source emits most of its light in the central direction R1, but also a significant amount of stray light is emitted nearly horizontally. This type of intensity distribution is not problematic as long as uniformity of the distributed light is not paramount.

Intensity distribution curve 40 shows the characteristic "batwing" distribution given by a bubble lens having a bell-shaped inner surface as seen in FIG. 3. The intensity curve 40 increases as a function of angle $\alpha$ up to 60 degrees, then it drops sharply. Note that the intensity curve 40 looks non-uniform going from 0 to 60 degrees. However, the emitted light per unit or area lit is more constant. At increasing angles $\alpha$ a larger surface is to be lit, hence the intensity must generally increase as a function of a to obtain a uniformly lit area.

A bubble lens having a bell-shaped inner surface thus uniformly lights a region within a defined angle of about 60 degrees from the vertical (sometimes this is called 120 degree distribution, because the distribution pattern is 60 degrees in either direction, and thus 120 degrees across), and beyond the 60 degrees the intensity drops sharply. This "batwing" profile minimizes the amount of useless horizontal stray light. Different patterns can show the same general "batwing" shape, but for example provide uniform light distribution over 80 degrees, 70 degrees, 65 degrees, etc. (as measured from the optical axis).

The luminaire according to the invention preferably has an intensity distribution 40 corresponding to the intensity distribution 40 of each individual LED. By mounting the LEDs 26, 27, 28 on the boards 20, 21, 22, 23, 24, 25 in such a way that the optical axis of each LED 26, 27, 28 is essentially perpendicular to the plane of the corresponding board 20, 21, 22, 23, 24, 25, and then mounting the LED boards in such a way that the plane of each board is essentially parallel to the base plate 13 or the luminaire 10, the optical axis of the whole luminaire 10 will essentially correspond to the optical axis of each LED, and thus be substantially perpendicular to the base plate 13.

Figure 5:
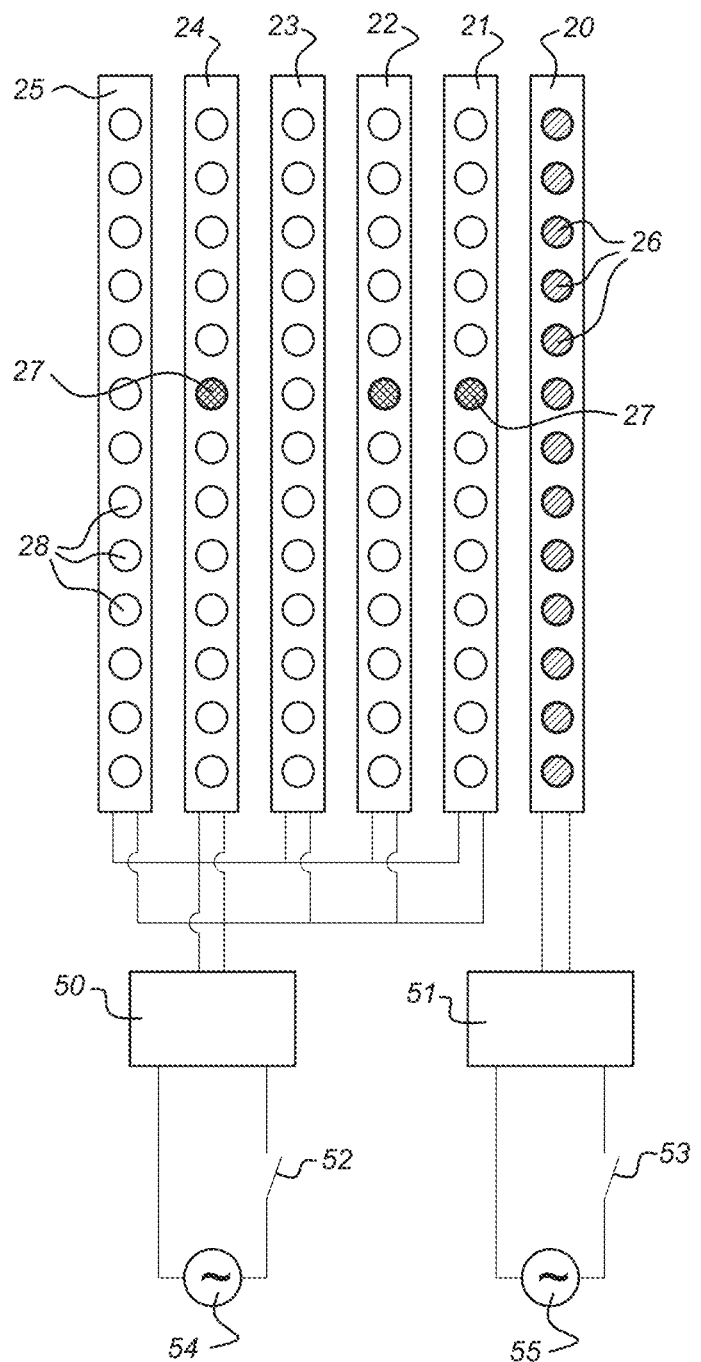

FIG. 5 schematically shows LED boards and drivers according to an embodiment of the invention. On each LED board 20-25, the LEDs are connected in series. This has the advantage that each LED on the board receives the same electrical current. The first and second LED boards 21-25, which together constitute the first LED arrangement for daylight, are preferably connected in series (although the figure shows them being connected in parallel) to a first driver 50 which receives power from an alternating current (AC) source 54.

Instead of using second LED boards 21, 22, 24 which comprise just one LED of the second type 27, it is possible to use at least one second LED board comprising substantially only LEDs of the second type 27 together with a plurality of first LED boards 23, 25 comprising only LEDs of the first type 28. In this case, the second LED board in itself constitutes a second LED arrangement, which can be used independently of the first LED arrangement. In this way, energy can be saved by using only the second LED arrangement for daylight when there are no people in the barn.

The third LED board 20, which in itself constitutes the third LED arrangement for night-time illumination, is connected to a second driver 51 which receives power from an AC source 55. Switches 52, 53 control the power supply to drivers 50 and 51 respectively. By setting the switches from a control device (not shown), the system can switch between "day-time" mode (switch 52 closed, 53 open), "night-time" mode (switch 52 open, 53 closed) and "off" mode (switches 52 and 53 open).

If the second LED arrangement described above is used, it needs to be connected to a separate driver, and the switch needs to be able to switch also between "normal" and "energy-saving blue" lighting modes, where the "energy-saving blue" lighting mode uses only the second LED arrangement. This mode can then be used at times when there are no people in the barn.

In this particular example, standard electricity grid AC sources 54 and 55 are shown. However, it is also possible to use other types of sources, e.g. from solar energy or wind energy.

The durability of the LED luminaire is affected both by the durability of each LED and by the durability of the assembly as a whole.

In order to make the LEDs more durable, the system should be dimensioned so that the current is as low as possible; The higher the current, the shorter the life span of the LED packages. For a typical LED, the nominal current is 350 mA. The drivers 50, 51 should thus be adapted to supply a current of 350 mA times the number of connected LED boards. It is also possible to use multiple or multi-channel drivers, e.g. connect LED board 21, 22 to a first sub-driver, LED boards 22, 23 to a second sub-driver, etc. In this way, no driver has to supply more than 700 mA.

The forward voltage (Vf) of a LED changes over time. For a LED in a series, as the LED forward voltage (i.e. the voltage drop) changes, the proportional power supplied to the LED will vary over time. In order to suppress this effect, in an advantageous embodiment each LED board is provided with its own driver unit. In an alternative embodiment, all LED boards in each arrangement are connected in series using a single driver. This requires a driver that can deliver sufficient power for all LEDs. If such a driver is used, then automatically all LEDs receive the same current due to the series connection.

In order to make the connection of the LEDs to the boards durable, the solder material that is used for attaching the LEDs to the boards should be chosen to be a very strong solder material that will hold the LEDs in place for many years. In the same way, the glue that is used for attaching the lenses to the board should be explicitly selected for its strength to last for many years. Finally, care should be taken during assembly of the frame and window which encapsulates the LEDs, the lenses and the wiring, so that dirt and moisture cannot penetrate.

Figure 6:
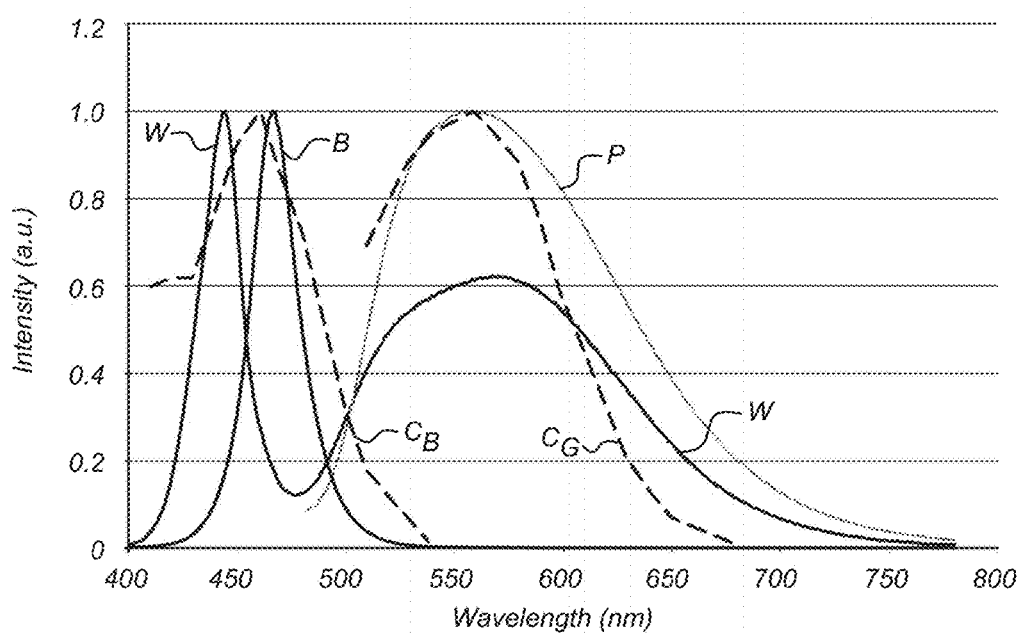

FIG. 6 schematically shows typical eye sensitivity curves for a cow. Curve CB represents the blue part (the S cones in the cow eye) of the eye sensitivity curve, and CG the green part (the M/L cones in the cow eye). Cows have, compared to humans, very low eye sensitivity in the red part of the spectrum. As a consequence, standard white light sources, which are typically engineered for a close match with the human eye sensitivity curve so as to give good colour rendering properties, are not automatically optimal for lighting for cows. In particular, standard white light sources tend to "waste" energy in the red part of the spectrum where cows have low eye sensitivity. Because of this, a mixture of blue (curve B) and white (curve W) LEDs is attractive. The curve W shows the wavelength distribution of a phosphor-coated blue LED, which has a peak around 560 nm and a further peak around 440 nm.

According to an aspect of the invention, it is advantageous to use a blue LED with a phosphor coating that generates light that corresponds well with the CG curve as the LED of the first type. For example, a phosphor with "lime" color, shown in curve P, would closely match the CG curve and emits relatively little light in the red part of the spectrum. Care should be taken to select a good LED as a starting point, since off-the-shelf LEDs typically emit more light in the red part than necessary, resulting in sub-optimal energy consumption.

Alternatively, any other LED which has at least one peak wavelength in the wavelength range between 500 and 600 nm could be used as the LED of the first type. If e.g. a green LED with its peak wavelength in the wavelength range between 550 and 570 nm is used as the LED of the first type, a suitable combination of green and blue LEDs would still emit "white" light.

In the foregoing description of the figures, the invention has been described with reference to specific embodiments thereof. It will, however, be evident that various modifications and changes may be made thereto without departing from the scope of the invention as summarized in the attached claims. The invention is thus not limited to the described embodiments but may be varied and modified freely within the scope of the claims. In particular, combinations of specific features of various aspects of the invention may be made. An aspect of the invention may be further advantageously enhanced by adding a feature that was described in relation to another aspect of the invention. Further, even though a specific optical system is described, a skilled person will be able to design different optical systems which produce the shown batwing profile or other slightly different patterns.

The invention claimed is:

1. A LED luminaire (10) for use in a livestock barn, comprising:
   a luminaire body with a base plate (13);
   a first LED arrangement comprising a first electronics board (23, 25) mounted to the base plate and a plurality of LEDs mounted to the first electronics board (23, 25), the LEDs mounted to the first electronics board (23, 25) being only of a first type (28) having at least one peak wavelength in a wavelength range between 500 and 600 nm, wherein the LEDs of the first type (28) are each a white LED;
   a second LED arrangement comprising a second electronics board (21, 22, 24) mounted to the base plate and a plurality of LEDs mounted to the second electronics board (21, 22, 24), the plurality of LEDs mounted to the second electronics board (21, 22, 24) comprising i) a plurality of white LEDs having at least one peak wavelength in a wavelength range between 500 and 600 nm and ii) at least one LED of a second type (27), the second type LED being a blue LED with a peak wavelength in a wavelength range between 440 and 480 nm;
   a first driver operatively connected to the first LED arrangement, the first driver providing power to the LEDs mounted to the first electronics board (23, 25);
   a second driver operatively connected to the second LED arrangement, the second driver providing power to the LEDs mounted to the second electronics board (21, 22, 24), the first driver (50) being separate from the second driver (51) and allowing the first LED arrangement to be operated independently of the second LED arrangement; and an optical system (30) covering each LED, the optical system distributing light emitted by the LEDs according to an intensity distribution (40) with a peak intensity at an angle of more than zero degrees from an optical axis of the luminaire, wherein the optical system for creating the intensity distribution (40) is provided by each LED being comprised of a respective individual optical lens (30), the individual optical lens (30) of each LED distributing light emitted by each LED according to the intensity distribution (40) with the peak intensity at the angle of more than zero degrees from the optical axis of the luminaire.

2. The LED luminaire (10) of claim 1, wherein luminaire body the further comprises:
 i) two side walls (11), each side wall provided with a guide that mounts a glass plate or a plastic plate, the base plate being between the two side walls, and
 ii) a heat sink with fins (12) that extend away from the base plate in a direction opposite to a direction in which the side walls extend from the base plate, and
 a length of the base plate is in a range of 600-1000 mm.

3. The LED luminaire (10) of claim 1, wherein a ratio of the LEDs of the first type (28) to the LEDs of the second type (27) in the second LED arrangement is at least 10 to 1.

4. The LED luminaire (10) of claim 1, wherein the second LED arrangement only comprises LEDs of the first type (28) and LEDs of the second type (27).

5. The LED luminaire (10) of claim 1, wherein the peak wavelength of the at least one LED of the second type (27) is in the wavelength range between 455 and 475 nm.

6. The LED luminaire (10) of claim 1, wherein the LED of the first type (28) comprises a blue LED with a phosphor-coating, the blue LED having a peak wavelength in the wavelength range between 440 and 460 nm without phosphor-coating.

7. The LED luminaire (10) of claim 1, wherein the peak intensity of said intensity distribution (40) is at an angle of at least 40 degrees from the optical axis of the luminaire.

8. The LED luminaire (10) of claim 7, wherein the peak intensity of said intensity distribution (40) is at an angle of at most 75 degrees from the optical axis of the luminaire.

9. The LED luminaire (10) of claim 1, wherein said lens is a side-emitting lens (30).

10. The LED luminaire (10) of claim 1, wherein said lens is a bubble lens (30) with a bell-shaped interior surface (33).

11. The LED luminaire (10) of claim 1, wherein, the second LED arrangement, in operation, emits predominantly blue light, and
 first and second switches that switch the first and second LED arrangements between i) a first normal mode with the first LED arrangement being in operation and the second LED arrangement being non-operational, and ii) a second blue mode with the second LED arrangement being in operation and the first LED arrangement being non-operational.

12. The LED luminaire (10) of claim 1, further comprising:
 a third LED arrangement (20) mounted to the base plate, the third LED arrangement, in operation, emitting light suitable for night lighting, said third LED arrangement comprising substantially only LEDs of a third type (26), each third type LED being a red LED with a peak wavelength in a wavelength range between 610 and 630 nm; and
 a third driver operatively connected to the third LED arrangement, the third driver providing power to the LEDs mounted to the third electronics board (20), the third driver being separate from the first and second drivers and allowing the first, second, and third LED arrangements to be operated independently of each other;
 a switch (52, 53) for switching between the different LED arrangements.

13. The LED luminaire (10) of claim 1, wherein the second electronics board (21, 22, 24) is comprised of plural series-connected boards and the LEDs of the second LED arrangement are mounted on the plural series-connected boards and are powered by a single one of the second driver.

14. The LED luminaire (10) of claim 1, further comprising a heat sink thermal-conductively connected to said base plate.

15. A combination of a plurality of said LED luminaire of claim 1 mounted in a livestock barn, wherein,
 each said LED luminaire is a 100 W LED luminaire, and adjacent luminaires are mounted at least 9 meters apart from each other.

16. A combination of a plurality of said LED luminaire of claim 2 mounted in a livestock barn.

17. The LED luminaire (10) of claim 1, wherein,
 the luminaire body further comprises a heat sink with fins, and
 a length of the base plate is in a range of 600-1000 mm.

* * * * *